(12) United States Patent
Chen

(10) Patent No.: US 11,314,127 B2
(45) Date of Patent: Apr. 26, 2022

(54) BACKLIGHT MODULE AND CONNECTING UNIT

(71) Applicant: AU OPTRONICS CORPORATION, Hsin-Chu (TW)

(72) Inventor: Shih-Chieh Chen, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 588 days.

(21) Appl. No.: 16/406,085

(22) Filed: May 8, 2019

(65) Prior Publication Data
US 2019/0347978 A1     Nov. 14, 2019

(30) Foreign Application Priority Data

May 11, 2018   (TW) .................................. 107116189

(51) Int. Cl.
  *G02F 1/13357*   (2006.01)
  *G09G 3/22*      (2006.01)
  *F21S 2/00*      (2016.01)

(52) U.S. Cl.
  CPC .......... *G02F 1/133605* (2013.01); *F21S 2/00* (2013.01); *G02F 1/133602* (2013.01); *G02F 1/133603* (2013.01); *G02F 1/133606* (2013.01); *G02F 1/133608* (2013.01); *G02F 1/133611* (2013.01); *G09G 3/22* (2013.01)

(58) Field of Classification Search
  None
  See application file for complete search history.

(56) References Cited

U.S. PATENT DOCUMENTS

2009/0263210 A1\* 10/2009 Loewe ................ F16B 19/1081
                                                       411/553
2015/0152910 A1    6/2015 Aoshima

FOREIGN PATENT DOCUMENTS

| TW | 104216319 | 3/2016 |
| TW | 105210021 | 1/2017 |
| TW | 105210850 | 2/2017 |
| TW | 106200715 | 4/2017 |
| TW | 102129363 | 10/2017 |

\* cited by examiner

*Primary Examiner* — Phu Vu
(74) *Attorney, Agent, or Firm* — WPAT, PC

(57) ABSTRACT

The present invention provides a backlight module and a connecting unit thereof. The connecting unit includes a base, a plurality of fixing pins and a plurality of connecting pins. The fixing pins protrude from the base and extend towards a first direction such that the fixing pins form an accommodating space. Each fixing pin includes a fixing portion arranged on an inner wall surface thereof. The connecting pins protrude from the base and extend towards the first direction. Each of the connecting pins has an end portion away from the base and bent away from the accommodating space. Each of the connecting pins has an abutting portion arranged on an outer wall thereof. The fixing portions are more deeply extended into the accommodating space than the inner wall surfaces of the connecting pins, and the abutting portions are more outwardly protruded than the outer wall surfaces of the fixing pins.

13 Claims, 8 Drawing Sheets

BACKLIGHT MODULE AND CONNECTING UNIT

FIELD OF THE INVENTION

The present invention relates to a backlight module and a connecting unit, and in particular, to a direct-lit backlight module and a connecting unit thereof.

BACKGROUND OF THE INVENTION

A backlight module of a prior art display device generally includes at least one diffuser and other optical films to adjust the light field. However, in order to support the optical films above the light source, or to further provide a light-mixing space between the light source and the optical films, a supporting unit generally is usually provided to support the optical films.

Such supporting unit of common design has a hook structure on the bottom end thereof unit, so that when the supporting unit passes through the assembly hole on a substrate, the hood structure can be fitted to the substrate to that the supporting unit is fixed to the substrate. When assembling the supporting unit, the supporting unit is generally held by a jig so as to avoid occupational injuries to assembly workers. However, the complex assembly process of the supporting unit often causes the hook structure to break. Therefore, it is a common practice in the prior art to create through holes on the back side of the substrate so as to examine if the assembly is successfully completed, which causes light leakage from the back side of the display after the backlight module is mounted on the display. Based on the above, in the prior art, the assembly structure of the supporting unit of the backlight module needs to be improved.

SUMMARY OF THE INVENTION

The technical problem to be resolved in the present invention is to provide a backlight module and a connecting unit thereof for the defect in the prior art. A supporting unit is fixed on a substrate by using the connecting unit, and the connecting unit and the supporting unit can be easily assembled and detached, to resolve a problem in the prior art that the supporting unit is easily broken, and shorten a process time.

To achieve the foregoing objectives, one of the technical solutions used in the present invention is to provide a connecting unit, including a base, a plurality of fixing pins, and a plurality of connecting pins. The plurality of fixing pins protrudes from the base and extends towards a first direction away from the base such that the fixing pins form an accommodating space. Each fixing pin includes a fixing portion arranged on an inner wall surface thereof and facing the accommodating space. The plurality of connecting pins protrudes from the base and extends towards the first direction such that the connecting pins surround the accommodating space. The fixing pins and the connecting pins are alternatingly arranged. Each of the connecting pins has an end portion away from the base and bent away from the accommodating space. Each of the connecting pins has an abutting portion arranged on an outer wall surface thereof and facing away from the accommodating space. Each of the fixing portions is more deeply extended into the accommodating space than the inner wall surface of each of the connecting pins 13 facing the accommodating space, and each of the abutting portions is more outwardly protruded than the outer wall surface of each of the fixing pins facing away from the accommodating space.

To achieve the foregoing objectives, another technical solution used in the present invention is to provide a backlight module, including a substrate, a connecting unit, and a supporting unit. The substrate has a carrying surface, an assembly hole is formed on the carrying surface, and the assembly hole has a hole wall. In the connecting unit, a base is accommodated in the assembly hole, and the end portion of a connecting pin is connected to the carrying surface. An abutting portion abuts against the hole wall, and a distance is provided between an outer wall surface of each fixing pin and the hole wall. The supporting unit includes a column body and at least one fitting groove. The column body has an assembly end and a supporting end that are opposite to each other. The at least one fitting groove is formed at a position on the column body close to the assembly end. The assembly end is accommodated in the accommodating space, and a fixing portion is engaged with the fitting groove.

To make a further understanding of features and technical content of the present invention, refer to the following detailed descriptions and drawings relevant to the present invention. However, the drawings provided are only used to provide references and illustrations, and are not used to limit the present invention.

DETAILED DESCRIPTION OF THE PREFERRED EMBODIMENTS

Implementations of a backlight module and a connecting unit thereof disclosed in the present invention are described by using the following specific embodiments and with reference to FIG. 1 to FIG. 9. Persons skilled in the art can understand advantages and effects of the present invention according to the disclosed content of this specification. However, the following disclosed content is not intended to limit the protection scope of the present invention. Persons skilled in the art can implement the present invention by using other embodiments based on different ideas and applications without departing from the concept of the present invention. In addition, it should be noted in advance that the accompanying drawings of the present invention are merely for illustrative description, and are not drawings according to actual sizes. Furthermore, although terms, such as first, second, third, and the like, may be used in this specification to describe various elements, these elements should not be limited by these terms which are mainly used for distinguishing the elements.

First Embodiment

Figure 1:
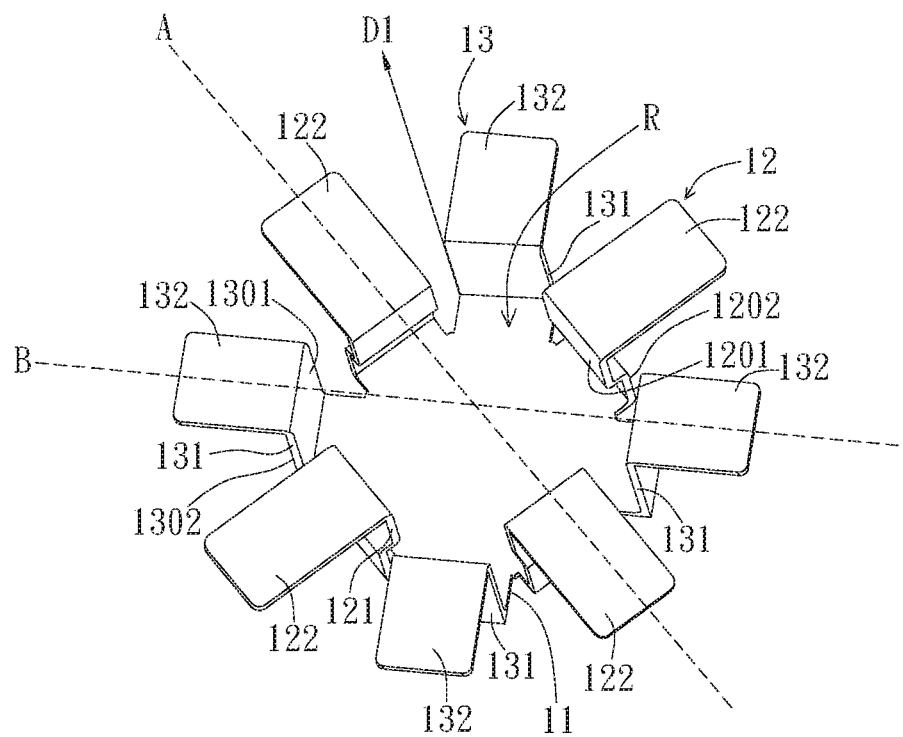
FIG. 1 is a schematic three-dimensional diagram of a connecting unit according to a first embodiment of the present invention.
Figure 2:
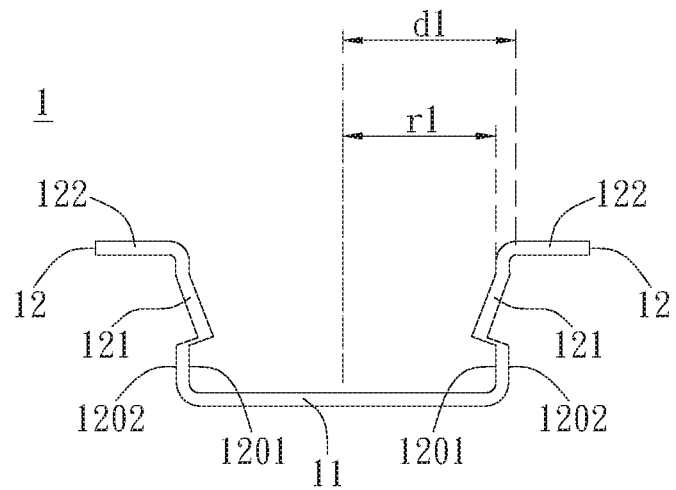
FIG. 2 is a side sectional view of the connecting unit according to the first embodiment of the present invention along a section line A in FIG. 1.
Figure 3:
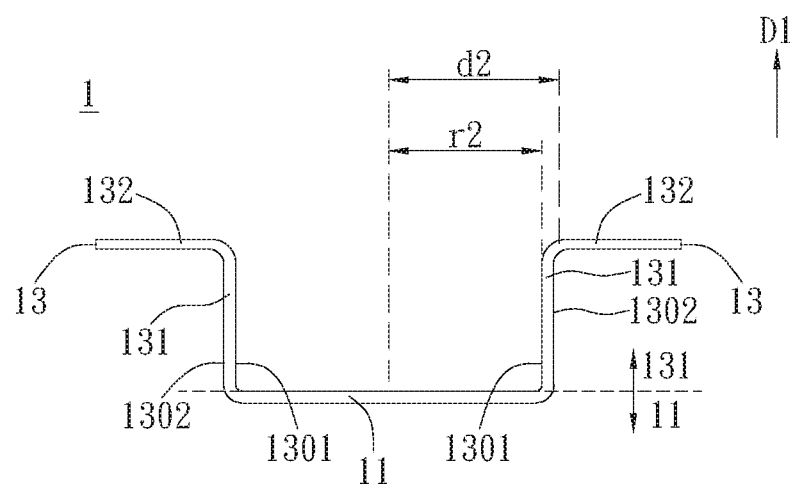
FIG. 3 is a side sectional view of the connecting unit according to the first embodiment of the present invention along a section line B in FIG. 1.

A connecting unit 1 according to the first embodiment of the present invention is described below with reference to FIG. 1 to FIG. 3. FIG. 1 is a schematic three-dimensional diagram of the connecting unit 1 according to this embodiment of the present invention, FIG. 2 is a side sectional view of the connecting unit 1 according to this embodiment along a section line A in FIG. 1, and FIG. 3 is a side sectional view of the connecting unit 1 according to this embodiment along a section line B in FIG. 1.

Referring to FIG. 1, the first embodiment of the present invention provides the connecting unit 1. The connecting unit 1 includes a base 11, a plurality of fixing pins 12, and a plurality of connecting pins 13. As shown in FIG. 1, the base 11 in this embodiment is substantially panel-shaped, and there are four fixing pins 12 and four connecting pins 13. An end of each of the fixing pins 12 and an end of each of the connecting pins 13 are respectively and correspondingly connected to sides of the base 11. However, the present invention is not limited thereto. For example, in other embodiments, a quantity of the fixing pins 12 and a quantity of the connecting pins 13 may be increased or decreased according to actual design considerations, and the base 11 may be a polygon or a circle whose side quantity corresponds to a sum of the quantity of the fixing pins 12 and the quantity of the connecting pins 13.

Further, as shown in FIG. 1, the fixing pins 12 and the connecting pins 13 in this embodiment are alternatingly arranged in such a manner that one fixing pin 12 and one connecting pin 13 are neighboring to each other. However, the present invention is not limited thereto. In other embodiments, for example, one fixing pin 12 and two connecting pins 13 are alternatingly arranged. Such alternate arrangement manners may be designed according to stress considerations during actual application of the connecting unit 1. Furthermore, as shown in FIG. 1, a gap is provided between the fixing pin 12 and the connecting pin 13 that are adjacent to each other. In this way, the fixing pin 12 and the connecting pin 13 may independently actuate relative to the base 11 to reduce a linkage with the neighboring fixing pin 12 or the connecting pin 13.

Referring to FIG. 1 again, each of the fixing pins 12 is connected to an edge of the base 11, and protrudes from the base 11 and extends along a first direction D1 away from the base 11. The fixing pins 12 form an accommodating space R. In this embodiment, the first direction D1 is substantially perpendicular to the base 11, that is, an extension direction of the fixing pin 12 is substantially perpendicular to the base 11. However, the present invention is not limited thereto. In actual applications, an angle between the fixing pin 12 and the base 11 may be designed according to actual application considerations. For example, when an object carried in the accommodating space R has an oblique side surface, the fixing pin 12 may cooperate with the side surface to obliquely extend towards the accommodating space R or away from the accommodating space R.

Referring to FIG. 1 again, each of the connecting pins 13 is connected to an edge of the base 11, and protrudes from the base 11 and extends along a first direction D1 such that the connecting pins 13 form an accommodating space R. Similarly, because the first direction D1 is substantially perpendicular to the base 11, an extension direction of the connecting pin 13 is substantially perpendicular to the base 11. However, the present invention is not limited thereto. In other embodiments, an angle between the connecting pin 13 and the base 11 may be designed according to actual application requirements. For example, when in a variant embodiment, the connecting unit 1 penetrates through a substrate having a relatively large curvature, the connecting pin 13 may cooperate with the substrate to extend out of the base 11 by extending towards the accommodating space R or away from the accommodating space R at an oblique angle.

Referring to FIG. 1 and FIG. 2, FIG. 2 is a side sectional view of the connecting unit 1 according to this embodiment along a section line A in FIG. 1. Each fixing pin 12 includes a fixing portion 121 arranged on an inner wall surface 1201 thereof and facing the accommodating space R. The fixing portion 121 in this embodiment is formed by bending the fixing pin 12 towards the accommodating space R and then bending the fixing pin 12 away from the accommodating space R. However, an implementation of the fixing portion 121 in the present invention is not limited to this embodiment. An end portion 122 of each of the fixing pins 12 away from the base 11 is bent away from the accommodating space R. In actual applications, the fixing portion 121 is configured to stop an object located in the accommodating space R to prevent the object from exiting the accommodating space R along the first direction D1. Preferably, the bent end portion 122 may be configured to connect to an edge of a through hole on the substrate for arranging the connecting unit 1, to support the base 11 to carry the object.

Referring to FIG. 1 and FIG. 3, FIG. 3 is a side sectional view of the connecting unit 1 according to this embodiment along a section line B in FIG. 1. Each of the connecting pins 13 has an abutting portion 131 arranged on an outer wall 1302 thereof and facing away from the accommodating space R. The abutting portion 131 in this embodiment is formed by extending a part of the connecting pins 13 away from the accommodating space R towards a direction away from the accommodating space R and then bending and extending the extended part towards the first direction D1. However, an implementation of the abutting portion 131 is not limited thereto. Further, an end portion 132 of each of the connecting pins 13 away from the base 11 is bent towards a direction away from the accommodating space R. Similar to the end portion 122 of the fixing pins 12, the bent end portions 132 of the connecting pins 13 are configured to connect to the edge of the through hole on the substrate for arranging the connecting unit 1, to support the base 11 to carry an object. Specifically, in this embodiment, the end portions 132 may serve as solder joints for punching the connecting unit 1 on the substrate in an SMT manner. A detailed application situation is described in detail in a second embodiment.

Referring to FIG. 1 to FIG. 3, it can be seen from FIG. 1 that, the fixing portions 121 are more deeply extended into the accommodating space R than the inner wall surfaces 1301 of the connecting pins 13. Specifically, referring to FIG. 2, a minimum distance between the fixing portion 121 in this embodiment and a center of the accommodating space R is r1, that is, the distance between the center of the accommodating space R and a turning point that is of the fixing portion 121 and that is bent outwardly from the accommodating space R is r1. As shown in FIG. 3, a minimum distance between an inner wall surface 1301 of the connecting pin 13 and the center of the accommodating space R is r2, and r1 is less than r2. In other words, because the fixing pin 12 and the connecting pin 13 are substantially perpendicular to the base 11, and r1 is less than r2, a position at which the connecting pin 13 is connected to the base 11 is farther away from the center of the accommodating space R than a position at which the fixing pin 12 is connected to the base 11. In this way, the fixing portions 121 are more deeply extended into the accommodating space R than the inner wall surfaces 1301 of the connecting pins 13.

Referring to FIG. 1 to FIG. 3, in this embodiment, according to the foregoing structure of "a position at which the connecting pin 13 is connected to the base 11 is farther away from the center of the accommodating space R than a position at which the fixing pin 12 is connected to the base 11", in the present invention, the abutting portions 131 are more outwardly protruded than an outer wall surface 1202 of the fixing pin 12 away from the accommodating space R. Specifically, as shown in FIG. 2, in this embodiment, a distance between the outer wall surface 1202 of the fixing pin 12 and the center of the accommodating space R is d1, and a maximum distance between the abutting portion 131 and the center of the accommodating space R is d2. Because d1 is equal to r1 plus the thickness of the fixing pin 12, d2 is equal to r2 plus the thickness of the connecting pin 13, r1 is less than r2 according to the foregoing descriptions, and the thickness of the fixing pin 12 is substantially equal to the thickness of the connecting pin 13 in this embodiment, d2 is greater than d1, that is, the abutting portions 131 are more outwardly protruded than the outer wall surfaces 1202 of the fixing pins 12 away from the accommodating space R.

In this embodiment, according to the foregoing structure features of "the fixing portion 121 are more deeply extended into the accommodating space R than the inner wall surfaces 1301 of the connecting pins 13" and "the abutting portions 131 are more outwardly protruded than the outer wall surfaces 1202 of the fixing pins 12 facing away from the accommodating space R", the connecting unit 1 in the present invention uses the abutting portions 131 of the connecting pins 13 as auxiliary supporting points. In actual applications, when the connecting unit 1 is punched in the through hole of the substrate in the SMT manner, the connecting unit 1 can be fixed in the through hole of the substrate by means of a connection force of solder joints after the punching and an auxiliary supporting force of the abutting portions 131, and the fixing portions 121 are closer to the center of the accommodating space R than the abutting portions 131, so as to stop the object carried in the accommodating space R. However, in different embodiments, the connecting unit 1 may also be fixed in the through hole of the substrate by merely using a tight-fit supporting force between the abutting portion 131 and an inner wall of the arranged through hole.

In this embodiment, the connecting unit 1 is preferably formed through stamping by using an elastic metal or other elastic materials. In this way, the connecting unit 1 is applicable to a curved substrate, where the elastic metal material can absorb a stress between the connecting unit 1 and other matching elements (such as the substrate or the object arranged in the accommodating space R). However, the material of the connecting unit 1 is not limited in the present invention. The material of the connecting unit 1 may be selected depend on a way in which the connecting unit 1 is embedded in the substrate. For example, when the connecting unit 1 is made of an elastic metal material, the connecting unit 1 may be arranged on the substrate in a SMT punching manner. In other embodiments, the connecting unit is made of elastic plastic, and the connecting unit may be arranged on the substrate in a thermal fusion welding manner.

Second Embodiment

Figure 4:
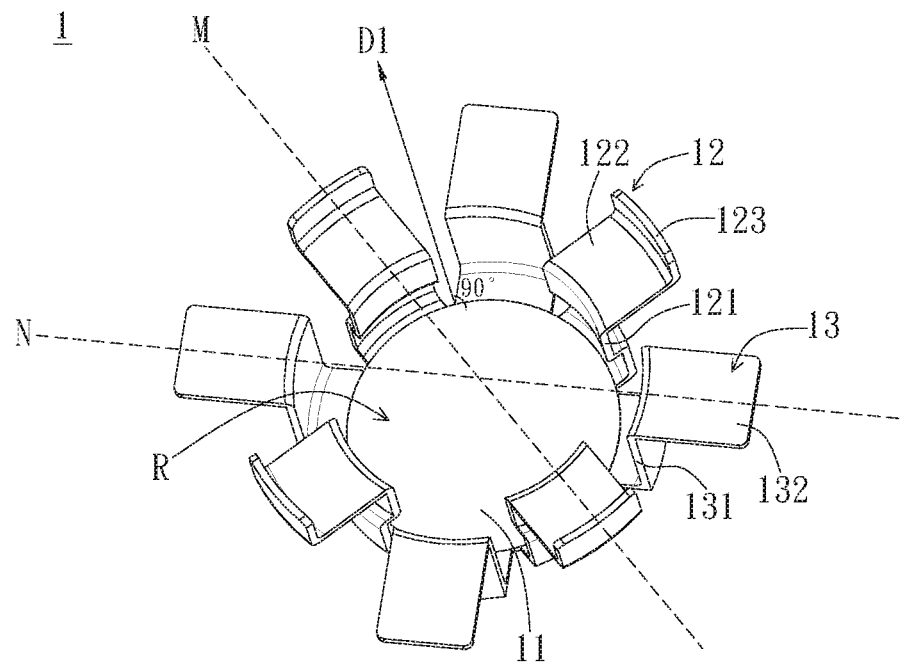
FIG. 4 is a schematic three-dimensional diagram of a connecting unit according to a second embodiment of the present invention.

A backlight module and a connecting unit thereof according to the second embodiment of the present invention are described below with reference to FIG. 4 to FIG. 9. Referring to FIG. 4, FIG. 4 is a schematic three-dimensional diagram of the connecting unit 1 according to this embodiment. The connecting unit 1 in this embodiment is substantially the same as the connecting unit 1 in the first embodiment in structure. For similarities, details are not described herein again. Main differences between the connecting unit 1 in the second embodiment and the connecting unit 1 in the first embodiment are described as follows:

First, as shown in FIG. 4, the base 11 in this embodiment is circular-shaped, and the fixing pin 12, the fixing portion 121, the connecting pin 13, and the abutting portion 131 all correspond to the circular base 11, to have a circular arc curvature centered around the accommodating space R.

Second, as shown in FIG. 4, an difference between this embodiment and the first embodiment lies in that, in the first embodiment, the end portion 122 of the fixing pin 12 is bent towards a direction away from the accommodating space R; however, in this embodiment, the end portion 122 of the fixing pin 12 is bent again towards the first direction D1 to form a hook 123 after being bent towards the direction away from the accommodating space R.

Figure 5:
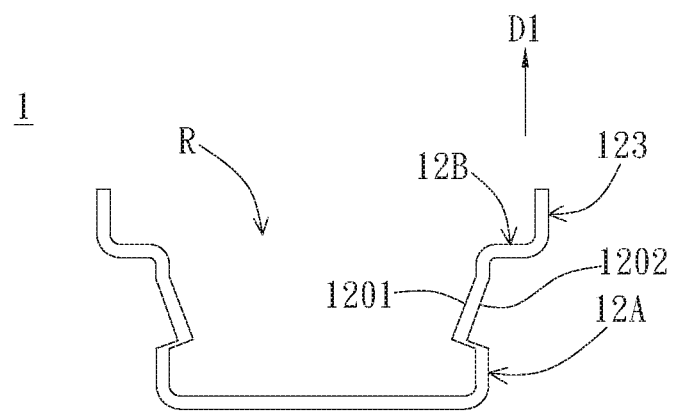
FIG. 5 is a side sectional view of the connecting unit according to the second embodiment of the present invention along a section line M in FIG. 4.

A structure of the fixing pin 12 in this embodiment is described in detail below with reference to FIG. 5, where FIG. 5 is a side sectional view along a section line M in FIG. 4. Each fixing pin 12 in this embodiment has a body 12A and a control portion 12B. The body 12A is connected to the base 11, and the outer wall surface 1202 of the fixing pin 12 is located on the body 12A. The control portion 12B is connected to an end of the body 12A away from the base and is bent outwardly relative to the body 12A, where an end of the control portion 12B away from the body 12 A is bent along the first direction D1 to form the hook 123. In this way, when the hook 123 is pulled towards a direction away from the accommodating space R, this embodiment can make a carried object originally stopped in the accommodating space R by the fixing portion 121 get rid of the stopping of the fixing portion 121, so that the carried object can be taken out of the connecting unit 1 from the accommodating space R.

Figure 6:
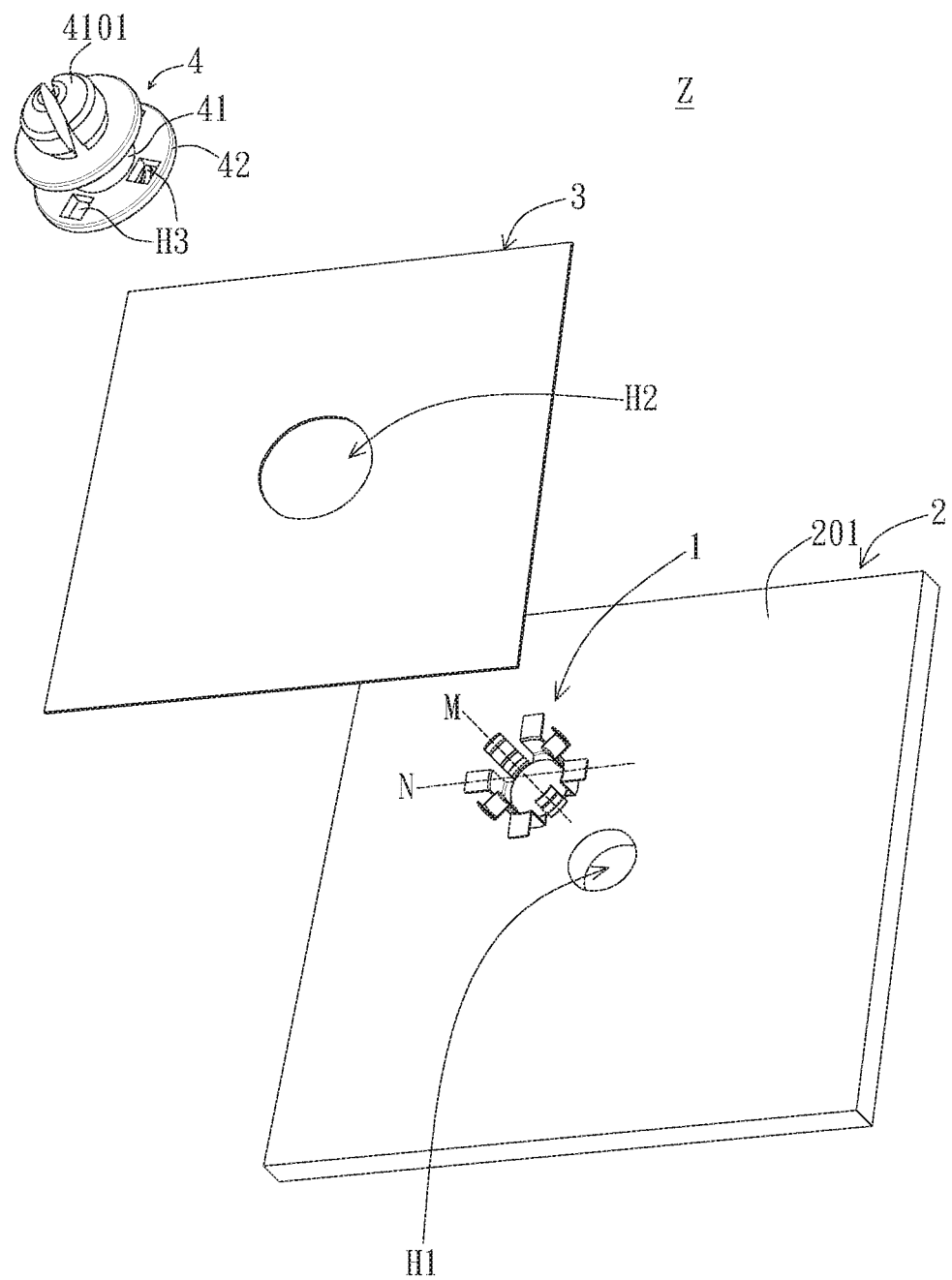
FIG. 6 is a schematic exploded view of a backlight module according to the second embodiment of the present invention.

An implementation in which the connecting unit 1 is applied to the backlight module Z is described below. Referring to FIG. 6, FIG. 6 is a schematic exploded view of the backlight module Z according to the second embodiment of the present invention. The backlight module Z of this embodiment includes the connecting unit 1, a substrate 2, a light reflecting layer 3, and a supporting unit 4. The substrate 2 has a carrying surface 201, and the carrying surface 201 has an assembly hole H1, and the assembly hole H1 has a hole wall 202. The light reflecting layer 3 is arranged on the carrying surface 201, a through hole H2 is formed on the light reflecting layer 3, and the through hole H2 is in communication with the assembly hole H1.

Figure 7:
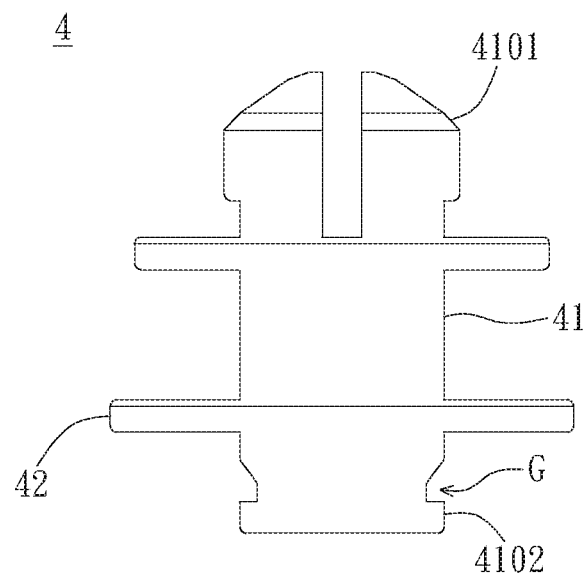
FIG. 7 is a schematic side view of a supporting unit according to the second embodiment of the present invention.

Referring to FIG. 6 and FIG. 7, the supporting unit 4 includes a column body 41, a fitting groove G, and a flange 42. The column body 41 has a supporting end 4101 and an assembly end 4102 that are opposite to each other, and the fitting groove G is formed at a position on the column body 41 close to the assembly end 4102. The flange 42 is located between the assembly end 4102 and the supporting end 4101 and is arranged around the column body 41. Furthermore, a plurality of guide holes H3 is formed on the flange 42, and a quantity of the plurality of guide holes H3 corresponds to a quantity of the fixing pins 12. In this embodiment, the foregoing "correspond" means that the quantity of the guide holes H3 is the same as the quantity of the fixing pins 12, so that the hooks 123 of the fixing pins 12 pass through the guide holes.

Figure 8:
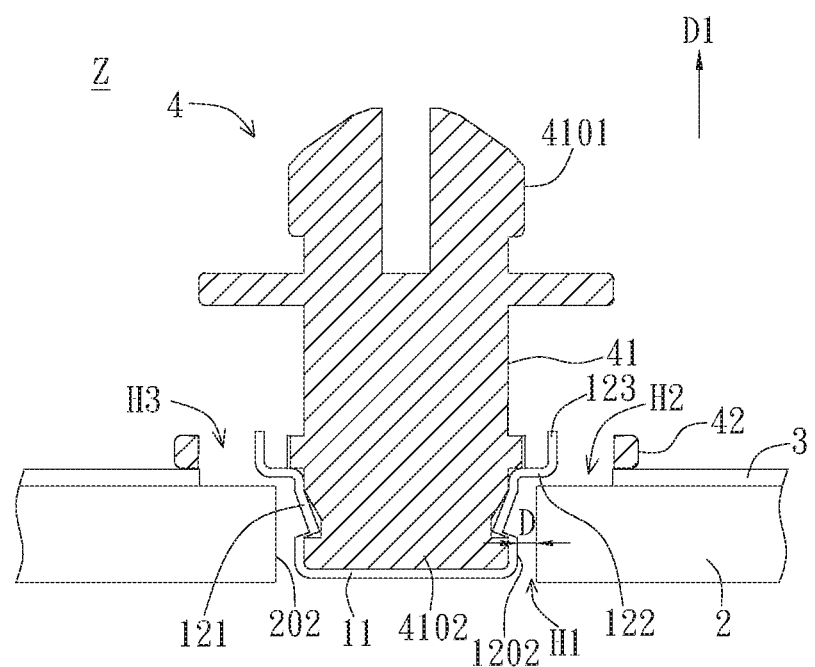
FIG. 8 is a partial side sectional view of the backlight module according to the second embodiment of the present invention along a section line M in FIG. 6.
Figure 9:
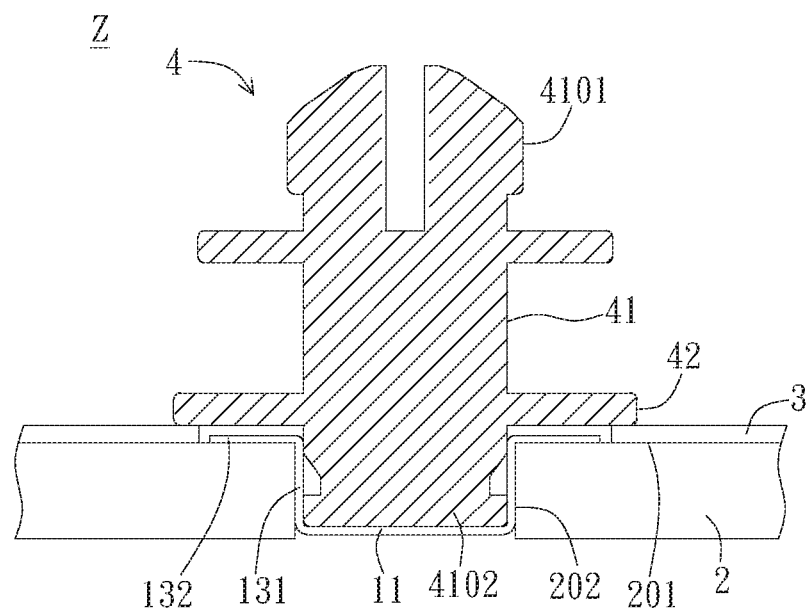
FIG. 9 is a partial side sectional view of the backlight module according to the second embodiment of the present invention along a section line N in FIG. 6.

A schematic sectional view when the connecting unit 1, the substrate 2, the light reflecting layer 3, and the supporting unit 4 are assembled is described below with reference to FIG. 8 and FIG. 9 FIG. 8 is a schematic partial sectional view along a section line M in FIG. 6, and FIG. 9 is a schematic partial sectional view along a section line N in FIG. 6.

First, referring to FIG. 8, when the connecting unit 1 and the supporting unit 4 are assembled on the substrate 2, the base 11 of the connecting unit 1 is accommodated in the assembly hole H1, and the base 11 carries the supporting unit 4, so that the assembly end 4102 of the supporting unit 4 is accommodated in the accommodating space R. The fixing portion 121 of the fixing pin 12 is engaged with the fitting groove G of the supporting unit 4, so that the fixing portion 121 can stop the supporting unit 4 from exiting the accommodating space R.

Referring to FIG. 8 again, the hook 123 of the fixing pin 12 protrudes towards the first direction D1 by passing through the through hole H2 of the light reflecting layer 3 and the guide hole H3 of the supporting unit 4, and the hook 123 may move towards a direction away from the accommodating space R to actuate the fixing pin 12 and make the supporting unit 4 get rid of the stopping of the fixing portion 121. Further, in this embodiment, because of the foregoing structure features of "the fixing portions 121 are more deeply extended into the accommodating space R than the inner wall surfaces 1301 of the connecting pins 13" and "the abutting portion 131 are more outwardly protruded than the outer wall surfaces 1202 of the fixing pins 12 facing away from the accommodating space R", a distance is provided between the outer wall surface 1202 of the fixing pin 12 and the hole wall 202 so that when the hook 123 actuates the fixing pin 12, the outer wall surface 1202 of the fixing pin 12 is not stopped by the hole wall 202, thereby avoiding affecting the actuation that the hook 123 links the fixing pin 12. Furthermore, by means of arranging the guide hole H3 on the flange 42, when the supporting unit 4 and the connecting unit 1 are assembled together, it can be determined, by observing from the guide hole H3 whether the hook 123 is bounced back to a correct position, whether the assembling between the connecting unit 1 and the supporting unit 4 is successful, without performing additional destructive perforation on a back plate to check an assembling status.

Referring to FIG. 9, when the connecting unit 1, the substrate 2, the light reflecting layer 3, and the supporting unit 4 are assembled, the end portion 132 of the connecting pin 13 is connected to the carrying surface 201 by means of welding, thermal fusion welding, or other manners. Specifically, actual assembling steps may be: For example, first connect the connecting unit 1, the substrate 2, and the light reflecting layer 3, and then place the assembly end 4102 of the supporting piece 4 into the accommodating space R of the connecting unit 1, to assemble the supporting unit 4 into the connecting unit 1. The end portion 132 of the connecting pin 13 is located in the through hole H2 of the light reflecting layer 3 in an assembled state, and the flange 42 of the supporting unit 4 covers the through hole H2. Preferably, a structure of the flange 42 can achieve, for example, the following two functions: First, the flange 42 is configured to cover the through hole H2 of the light reflecting layer 32 during assembly, to reduce a light leakage status of the through hole H2. Second, as described in the foregoing paragraph, when the guide hole H3 is arranged on the flange 42, the assembling status can be observed from the assembling surface (the carrying surface 201). Furthermore, the abutting portion 131 of the connecting pin 13 abuts against the hole wall 202 when the assembling is completed, to obtain a reaction force provided by the hole wall 202 in a direction parallel to the substrate 2, so that the connecting unit 1 is statically balanced in the direction parallel to the substrate 2. An abutting force between the abutting portion 131 and the hole wall 202 and a connection force between the end portion 132 and the carrying surface 201 enable the entire connecting unit 1 to be fixed in the assembly hole H1.

Third Embodiment

Figure 10:
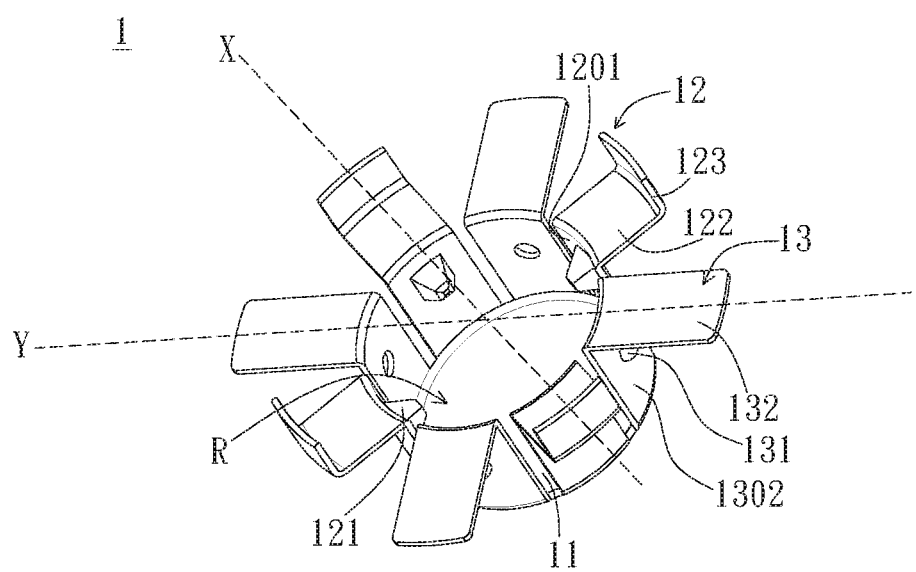
FIG. 10 is a schematic three-dimensional diagram of a connecting unit according to a third embodiment of the present invention.
Figure 11:
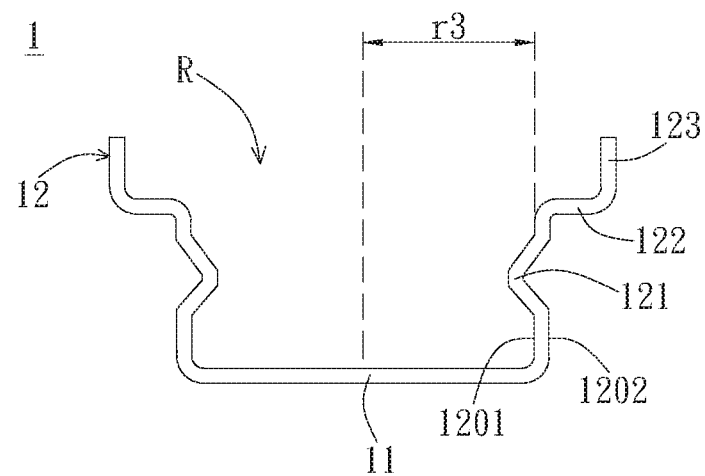
FIG. 11 is a side sectional view of the connecting unit according to the third embodiment of the present invention along a section line X in FIG. 9.

A backlight module Z and a connecting unit 1 thereof according to the third embodiment of the present invention are described below with reference to FIG. 10 to FIG. 14. Same elements in this embodiment and the second embodiment have substantially same structures and same reference numerals, and are not be described herein again. Main differences between this embodiment and the second embodiment lie in implementations of the fixing portion 121 and the abutting portion 131. Detailed descriptions are as follows:

Referring to FIG. 10 and FIG. 11, in this embodiment, the fixing portion 121 is a protuberance on the inner wall surface 1201 of the fixing pin 12 and protruding towards the accommodating space R. It should be noted that a specific shape of the protuberance is not limited to the drawings of this specification. In other variant embodiments, designs of the shape of the protuberance may be different to match a shape of the fitting groove G of the supporting unit 4.

Figure 12:
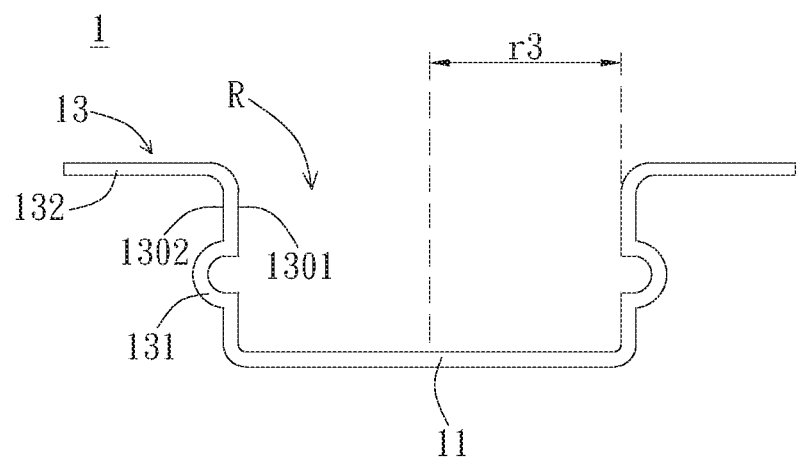
FIG. 12 is a side sectional view of the connecting unit according to the third embodiment of the present invention along a section line Y in FIG. 9.

Referring to FIG. 10 and FIG. 12, the abutting portion 131 in this embodiment is a protuberance on the outer wall surface 1302 of the connecting pin 13 and protruding away from the accommodating space R. Similarly, a shape of the protuberance of the abutting portion 131 is not limited to the figure, and the height of the protuberance is a distance between the outer wall surface 1302 of the connecting pin 13 and the hole wall 202 of the assembly hole H1 of the substrate 2.

Since the abutting portion 131 in this embodiment is implemented as a protuberance, compared with the second embodiment, the outer wall surface 1302 of the connecting pin 13 in this embodiment is closer to the center of the accommodating space R than the outer wall surface 1302 of the connecting pin 13 in the second embodiment. Specifically, referring to FIG. 12, a distance between the center of the accommodating space R and a junction between the fixing pin 12 and the base 11 in this embodiment is r3. Referring to FIG. 13 again, a distance between the center of the accommodating space R and a junction between the connecting pin 13 and the base 11 in this embodiment is also r3. Preferably, the base 11 in this embodiment is a circular plate having a uniform radius, and the fixing pin 12 and the connecting pin 13 are connected to the edge of the base 11. However, the present invention is not limited thereto. Furthermore, the fixing portion 121 and the abutting portion 131 in this embodiment may be formed through stamping.

Figure 13:
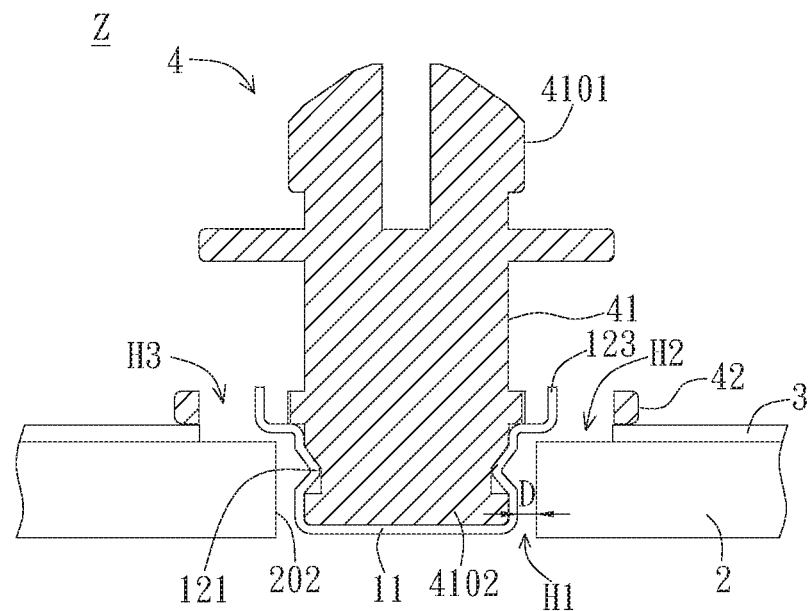
FIG. 13 is a partial side sectional view of a backlight module according to the third embodiment of the present invention along a section line X in FIG. 9.

Referring to FIG. 13, FIG. 13 is a side sectional view along a section line X in FIG. 10 after the connecting unit 1 and the supporting unit 4 of this embodiment are assembled to the backlight module Z. As shown in FIG. 13, the fixing portion 121 in this embodiment is implemented as a protuberance protruding towards the accommodating space (that is, a position at which the combine end 4102 of the supporting unit 4 is located in the figure). The fixing portion 121 matches the fitting groove G of the supporting unit 4 to stop the supporting unit 4 from exiting the accommodating space R.

Figure 14:
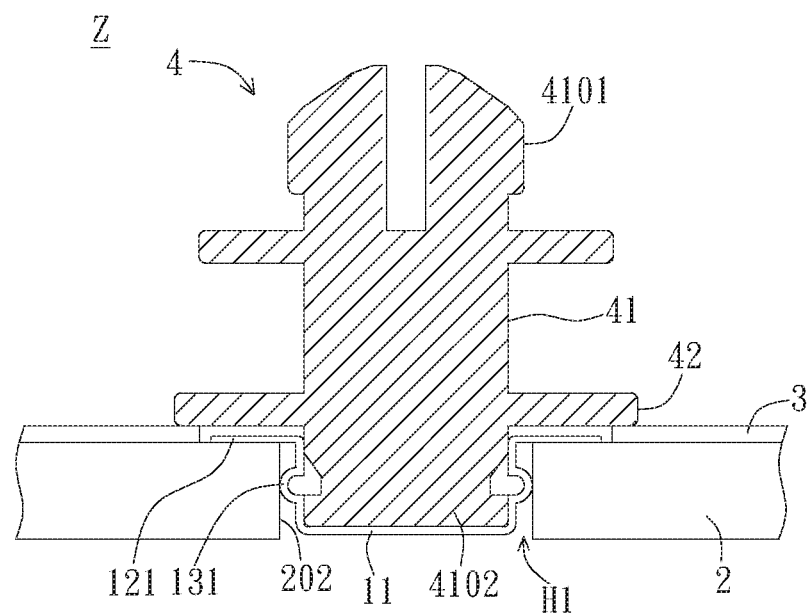
FIG. 14 is a partial side sectional view of the backlight module according to the third embodiment of the present invention along a section line Y in FIG. 9.

Please refer to FIG. 14. FIG. 14 is a side sectional view along a section line Y in FIG. 10 after the connecting unit 1 and the supporting unit 4 of this embodiment are assembled to the backlight module Z. As shown in FIG. 14, the abutting portion 131 in this embodiment is implemented as a protuberance protruding towards the hole wall 202, and the abutting portion 131 abuts against the hole wall 202, to form a supporting force in a direction parallel to the substrate 2 to fix the connecting unit 1 to the assembly hole H1.

In conclusion, in the embodiments of the present invention, the supporting unit 4 is fixed on the substrate 2 by using the connecting unit 1, the end portion 132 of the connecting pin 13 is bent away from the accommodating space R and may be soldered onto the substrate 2 by using a Surface Mount Technology (SMT). Moreover, by means of arranging the hook 123 on the fixing pin 12, the connecting unit 1 and the supporting unit 4 may be easily assembled and detached, to resolve a problem in the prior art that the bottom of the supporting unit 4 is easily broken, and shorten a process time. Furthermore, by means of arranging the guide hole H3 on the supporting unit 4, in the backlight module Z and the connecting unit 1 thereof provided in the present invention, after the supporting unit 4 is assembled, an assembling status may be observed from the carrying surface 201 through the guide hole H3. Therefore, a step of perforating a back plate to check the assembling status can be omitted, thereby further avoiding a subsequent light leakage problem.

The present invention has been described with reference to the above embodiments, but the above embodiments are merely examples for implementing the present invention. It should be noted that the disclosed embodiments are not intended to limit the scope of the present invention. On the contrary, any modification and equivalent configuration within the spirit and scope of the appended claims shall fall within the scope of the present invention.

What is claimed is:

1. A connecting unit, comprising:
    a base;
    a plurality of fixing pins, wherein the plurality of fixing pins protrudes from the base and extends towards a first direction away from the base such that the fixing pins form an accommodating space, and each fixing pin forms a fixing portion arranged on an inner wall surface thereof and facing the accommodating space; and
    a plurality of connecting pins, wherein the plurality of connecting pins protrudes from the base and extends towards the first direction such that the connecting pins surround the accommodating space, the fixing pins and the connecting pins being alternatingly arranged, each of the connecting pins having an end portion away from the base and bent away from the accommodating space, and each of the connecting pins having an abutting portion arranged on an outer wall surface thereof and facing away from the accommodating space, wherein
    the fixing portions are more deeply extended into the accommodating space than the inner wall surfaces of the connecting pins facing the accommodating space, and the abutting portions are more outwardly protruded than the outer wall surfaces of the fixing pins facing away from the accommodating space.

2. The connecting unit according to claim 1, wherein the base is perpendicular to the first direction, and the fixing pins and the connecting pins are separately connected to the edge of the base.

3. The connecting unit according to claim 1, wherein a gap is provided between the fixing pin and the connecting pin that are adjacent to each other.

4. The connecting unit according to claim 1, wherein the fixing portion is a protuberance formed on the fixing pin.

5. The connecting unit according to claim 1, wherein the fixing pin is bent towards the accommodating space and then bent away from the accommodating space so as to form the fixing portion.

6. The connecting unit according to claim 1, wherein the abutting portion is a protuberance on the connecting pin that protrudes outwardly from the connecting pin.

7. The connecting unit according to claim 1, wherein a part of the connecting pin extends away from the accommodating space and then is bent towards and extends along the first direction to form the abutting portion.

8. The connecting unit according to claim 1, wherein a position at which the connecting pin is connected to the base is farther away from a center of the accommodating space than a position at which the fixing pin is connected to the base.

9. The connecting unit according to claim 1, wherein each fixing pin has:
    a body connected to the base, wherein the outer surface is located on the body; and
    a control portion connected to an end of the body away from the base, the control portion being bent outwardly relative to the body, wherein an end of the control portion away from the body is bent to form a hook.

10. A backlight module, comprising:
    a substrate having a carrying surface, wherein the carrying surface has an assembly hole, the assembly hole having a hole wall;
    the connecting unit according to claim 1, wherein the base is accommodated in the assembly hole, the end portion being connected to the carrying surface, the abutting portion abutting against the hole wall, and a distance being provided between the outer surface of the fixing pin and the hole wall; and a supporting unit, including:
- a column body having an assembly end and a supporting end that are opposite from each other; and
- at least one fitting groove formed at a position on the column body close to the assembly end, wherein the assembly end is accommodated in the accommodating space, and the fixing portion is engaged with the fitting groove.

11. The backlight module according to claim 10, wherein the supporting piece comprises a flange arranged around the column body, and the flange is located between the assembly end and the supporting end and covers the end portions of the connecting pins.

12. The backlight module according to claim 11, further comprising a light reflecting layer arranged on the carrying surface, a through hole being formed on the light reflecting layer and in communication with the assembly hole, in which the end portions of the connecting pins are located in the through hole, and the flange covers the through hole.

13. The backlight module according to claim 11, wherein a plurality of guide holes is formed on the flange, the number of the plurality of guide holes corresponds to the number of the plurality of fixing pins, each of the fixing pins including:
- a body connected to the base, wherein the outer surface is located on the body; and
- a control portion connected to an end of the body away from the base and bent outwardly relative to the body, wherein an end of the control portion away from the body is bent to form a hook, the hook passing through the guide hole and moving away from the accommodating space to actuate the fixing pin.

\* \* \* \* \*